United States Patent [19]

Lewis et al.

[11] Patent Number: 4,748,038

[45] Date of Patent: May 31, 1988

[54] PROCESS FOR PREPARING SOYBEAN PRODUCTS

[76] Inventors: Victor M. Lewis; David A. Lewis, both of 19A Boundary Street, Rushcutters Bay N.S.W. 2011, Australia

[21] Appl. No.: 860,991

[22] Filed: May 8, 1986

Related U.S. Application Data

[63] Continuation of Ser. No. 601,775, Apr. 4, 1985, abandoned.

[51] Int. Cl.$^4$ ................................................ A23L 1/20
[52] U.S. Cl. ..................................... 426/456; 426/461; 426/465; 426/511; 426/634
[58] Field of Search ................ 426/634, 461, 464, 508

[56] References Cited

U.S. PATENT DOCUMENTS

| | | | |
|---|---|---|---|
| 1,509,076 | 9/1924 | Berczeller | 426/461 |
| 1,867,541 | 7/1932 | Shellabarger | 426/461 X |
| 3,058,829 | 10/1962 | Kovasznay et al. | 426/461 X |
| 3,290,155 | 12/1966 | Mustakas et al. | |
| 3,594,186 | 7/1971 | Hawley et al. | |
| 3,865,802 | 2/1975 | Mustakas | 530/378 |
| 3,881,033 | 4/1975 | Steele | 426/385 |
| 3,971,856 | 7/1976 | Daftary | 426/417 |
| 4,075,361 | 2/1978 | Oberg | 426/655 |
| 4,079,155 | 3/1978 | Kakade | 426/634 |
| 4,113,716 | 9/1978 | Gomi et al. | 426/634 |
| 4,137,339 | 1/1979 | Kudo | 426/634 |
| 4,199,733 | 10/1978 | Hsieh et al. | 426/46 |
| 4,209,541 | 6/1980 | Clatfelter et al. | 426/430 |
| 4,248,141 | 2/1981 | Miller, Jr. | 426/431 |
| 4,315,034 | 2/1982 | Levinson et al. | 426/104 |
| 4,318,933 | 3/1982 | Miller, Jr. | 426/508 |
| 4,359,480 | 11/1982 | Kock | 426/430 |

FOREIGN PATENT DOCUMENTS

| | | |
|---|---|---|
| 073581 | 9/1983 | European Pat. Off. . |
| 682793 | 10/1939 | Fed. Rep. of Germany . |
| 2756665 | 6/1978 | Fed. Rep. of Germany . |
| 2078743 | 10/1971 | France . |
| 2302695 | 3/1976 | France . |
| 2373974 | 7/1978 | France . |
| 53-145957 | 12/1978 | Japan . |
| 0500637 | 5/1937 | United Kingdom ................ 426/461 |
| 650192 | 2/1951 | United Kingdom . |
| 0780097 | 7/1957 | United Kingdom ................ 426/461 |
| 1385303 | 2/1975 | United Kingdom . |
| 2035044 | 6/1980 | United Kingdom . |
| 1571745 | 7/1980 | United Kingdom . |

OTHER PUBLICATIONS

Kirk–Othmer, "Encyclopedia of Chemical Technology", vol. 21, pp. 426–427.

*Primary Examiner*—Raymond N. Jones
*Assistant Examiner*—Mary S. Mims
*Attorney, Agent, or Firm*—Leon Zitver

[57] ABSTRACT

The invention relates to a method of producing a bland tasting full fat soy flour meal or grits (PSM) wherein the soybeans either whole or split are treated with live steam or water under atmospheric pressure at temperatures ranging between 85° to 100° C. for 2½ to 20 minutes or for an equal or shorter period under steam pressure in excess of atmospheric pressure, the combination of time and temperature under steam pressure in excess of atmospheric pressure being such that the degree of blandness in the resultant PSM is about equivalent to the blandness which results in the stated treatment under atmospheric pressure.

7 Claims, No Drawings

PROCESS FOR PREPARING SOYBEAN PRODUCTS

This application is a continuation of application Ser. No. 601,775, filed Apr. 4, 1985, now abandoned.

This invention relates to soybean products for human consumption.

The need to utilize vegetable protein directly for human food is widely acknowledged and it is also generally known that soybeans contain a high proportion of protein and a valuable oil content.

Soybean crops are grown in very large tonnages in many regions of the world. However, the major proportion of the world soybean crop is used for the extraction of oil with the consequent production of huge tonnages of defatted soy meal or cake. Most of this meal or cake is used as stockfood.

Defatted soy meal, while high in protein, has an unacceptable flavour for use in human food, having a strong beany or bitter flavour and only as the result of expensive and capital-intensive further processing can this meal be converted into forms which are more acceptable to human taste. Even so, a residual beany flavour usually persists which substantially reduces its consumer acceptance.

In some cases where the meal is intended for human consumption special steps are taken in the oil extraction and associated steps to improve the flavour, however the resultant meal still suffers to some degree from the above mentioned disadvantages.

If whole soybeans are simply ground to a meal or flour, the flavour is objectionable being described as "green", "painty" and "raw" such flavours being a consequence of the enzymatic activity in the full-fat soy flour so prepared. What is more, raw soybeans or flour prepared therefrom contain certain anti-nutritional factors which affect digestion and absorption of food. It has been proved that it is very important to reduce substantially such factors in such soybean products for human consumption.

Since the mentioned anti-nutritional factors are rendered inactive by heat, it has become common practice to subject soybeans to heating, for example, toasting, and a similar toasting process is used to improve the nutritional quality of defatted soy bean meal or flakes after extraction of soybean oils. However we observed that all commercially available full fat soy flours or defatted soy flours which we have examined still have a noticeable "beany" or "bitter" flavour and therefore are generally unsuitable for human food unless used as a very low proportion ingredient in food and/or used in conjunction with flavouring substances which will hide the "objectionable" flavours.

Mustakas et al (U.S. Pat. No. 3,290,155) have described a process for producing a superior full-fat soy flour using dehulled full-fat soy bean flakes or grits as a raw material in conjunction with a screw-type extruder in which the soy material is heated to 115°–145° C. under a dynamic pressure of 375–400 p.s.i. so as to expel from the soybean flakes as much soy bean oil as can be resorbed by the flakes on release from the pressure zone. Even with the use of such specialised equipment, we observe that the full-fat soy flour still has the mentioned beany flavour, which carries over into food products prepared therefrom.

Further methods are described in the prior art whereby use of elevated temperatures on pre-hydrated soyabeans results in slightly improved edible properties. (Tussaud in U.K. Pat. No. 364,309 used the action of sulphur dioxide at a temperature of 110° C.–140° C. for 25–40 minutes on soybeans which had been soaked in about 2½ times their weight of water resulting in a final moisture content of 4½%). Other methods use live steam in contact with whole or dehulled and split soybeans for periods of time, such as 25–40 minutes at 100° C. or about 5–10 minutes at an elevated steam pressure and a temperature well in excess of 100° C. but typically 120° C.–130° C. We have observed that the resultant products display a noticeably beany flavour which limits their use to very low percentages of use in a food product.

In the preparation of many foods it is desirable to add extra protein of high quality. Many of such foods contain fats or oils. Full fat soy flour normally contains about 40% of protein and about 18–20% soy bean oil. Soy bean oil is of high quality and includes a high proportion of unsaturated fatty acids a characteristic which is considered preferable for health reasons over more saturated fats.

In consequence it would be highly desirable if soy flours could be added to foods in any desired proportion without encountering the problem of off-flavours referred to and without the necessity of adding supplementary flavouring substances for the purpose of masking objectional flavours.

It is the object of the invention to process soybeans to produce full fat soy flour, meal or grits in such a way that the end product, hereafter referred to processed soy material (PSM) is free or substantially free of the mentioned "beany", "bitter", "painty", "ray" or "green" flavours, and of such bland character that it may be used as or in food products suitable for human consumption in substantial proportion so that significant improvement in protein content thereof is achieved.

It is a further object of the invention that the nutritional quality of the PSM is maximised for human food use so that there be no problems from residual anti-trypsin factors or other anti-nutritional factors.

It is a further object of the invention that the process be economical to carry out and not require the use of expensive or specialised equipment.

It is a further object of the invention that the process has low energy requirement and be capable of being operated by persons of reasonable skill but not requiring perons having a high degree of technical training and specialised skills.

It is a still further object of the invention that the PSM when dried should be stable under atmospheric conditions and able to be stored for long periods of time in a dry state without significant deterioration.

It is a still further object of the invention that the PSM should be capable of being used in the manufacture or preparation of more-or-less conventional foods which have a ready acceptance in all or most parts of the world. This is an important consideration since it is often found very difficult or impossible to introduce foods of special nutritional quality to peoples in need of such nutrition unless the foods are similar to or identical with the styles of foods with which such peoples are familiar.

The development of "green", "raw" or "painty" flavours are caused by the action of the enzymes of soybeans on the oil in the soybeans when the natural integral structure of the soybean is partially or wholly destroyed by mechanical processing.

Whereas prior art methods describe the use of heat, applied in a variety of ways, as a means of producing full fat soy flours, surprisingly we have found it is the very use of heat as previously described which is in fact responsible for the development of "beany" and "bitter" flavours.

Thus we have found that the development of "beany" and "bitter" flavours are caused as a consequence of subjecting the soybean material to time/temperature conditions beyond certain limits. Experiments have shown that development of these undesirable flavours is not an "all or nothing" phenomenon but that there will be a progressively increasing objectionable flavour developed in the soybean material as the time/temperature exposure increases.

Furthermore, we have also found that the same holds true for products which include a substantial proportion of PSM. If the product is subject to excessive time/temperature exposure the undesirable beany flavour can be induced in the prepared product even though the PSM used as a major ingredient at the commencement of the manufacturing process was bland in flavour. We have discovered, that as long as these principles are understood, it is possible to produce a wide variety of highly acceptable high protein foods, consisting of or containing PSM all having excellent storage life.

The invention accordingly resides in a process of producing PSM wherein whole or preferably split soybeans are treated with live steam or water under atmospheric pressure at temperatures ranging between 85° to 100° C. for 2½ to 20 minutes, preferably 2½ to 15 minutes or for an equal or shorter period with live steam or hot water under steam pressure in excess of atmospheric pressure, e.g., for 2½ minutes under steam pressure of 15 psi gauge, such combination of time and temperature under steam under pressure in excess of atmospheric pressure which results in a degree of blandness in the resultant PSM as is about equivalent to the blandness which results from the stated treatment under atmospheric pressure. The beans are thereafter compressed to form a multiplicity of cracks or fissures through the beans. The preferred method of heating the beans is by the use of steam. The beans thereafter may be dried by passing through the beans hot air at temperatures below 95° C., the lower the better.

The invention also resides in PSM produced in accordance with the mentioned process.

According to one embodiment of the invention in those cases where the beans are split the beans are first de-hulled and the loose hulls separated before the beans are subsequently processed.

The treated beans are then steamed in the manner described and are then ground to a flour, meal or grits as required. In the preferred embodiment of the invention the beans are reduced in size for example by rolling as they exit from the steam treatment. The reasons for this are that the beans are softer when they are steaming hot so that less energy is needed for size reduction. Additionally, it is more economical and quicker to carry out a subsequent drying step (where this is required) after the beans have been so reduced in size.

If the steamed beans are reduced in size immediately after steaming, then dehydrated, it may be necessary to further pulverise the material after dehydration depending on the physical form and the ultimate use of the material. This further pulverising operation is very simple to carry out and because the beans have already been partly pulverised immediately after steaming only low energy consumption is involved in further pulverising operations.

A further advantage is that less heat is generated during grinding because the beans have already been partly pulverised.

For certain applications or for certain market areas it may be desirable to remove a substantial proportion of the oligosaccharides from soy beans, especially stachyose and raffinose. This operation may be easily incorporated into the process. The preferred stage and method is that after steaming, the softened beans are compressed. For example, they may be passed between smooth rolls in a roller mill set at a gap of 0.6–1.0 mm. The beans will exit from the mill in a well flattened but in otherwise intact form.

The flattened beans while still hot may be subjected to the extracting action of water, preferably hot, as by percolating action. The extraction may be either on a batch basis or, preferably, in a continuous operation for example by counter current extraction. The use of a basket centrifuge or a continuous centrifuge is a convenient final step before drying. Because the beans have been reduced in thickness and have a sintered structure induced in them as a consequence of the hot rolling operation, the soluble oligosaccharides are readily eluted. The flattened beans remain intact. The extracted soybeans may then be further pulverised and/or dehydrated as described, or may be used directly in the preparation of other food products.

When processing of PSM is carried out at 100° C., a treatment time of 7–12 minutes is preferred for many applications. However, where considerable further heating may be involved in the manufacture of the ultimate food product in which PSM is a significant component, a period of treatment at 100° C. in steam of 2½–5 minutes is preferred. This is because there exists the potential for contained PSM to develop to a degree some beany or bitter flavours if the food product in which the PSM is a component is held at an elevated temperature for an excessive period of time.

With regard to use of steam under pressure, examples show that to achieve an equal degree of blandness in the PSM as is achieved at 2½–15 minutes at 100° C., the period of treatment is considerably shortened. Thus treatment of dehulled split soybeans for 2–2½ minutes at 135° C. (15 psi gauge) is about equivalent to 20 minutes at 100° C.

If it is desired to use steam under pressure, it will be necessary to carry out test runs to determine the duration of heat treatment in live steam under a particular pressure (i.e. at a particular temperature in excess of 100° C.) which will result in the desired bland tasting product. The treatment will need to be long enough to avoid green, painty or raw flavours developing in the PSM on storage, but short enough so that beany or bitter flavours do not develop in the PSM.

It will be apparent to persons skilled in the use of pressure steam treatments that a wide range of temperatures may be achieved according to the pressure of steam used. A person of reasonable skill will be able to establish by preliminary tests based on the experience recorded herein, a temperature (pressure)/time combination which is appropriate for the available processing facilities and which will produce a suitably bland-flavoured PSM.

When particulate split soybeans are treated at increasingly elevated temperatures, the temperature differential between the surface and the center of a bean becomes greater. This leads to an increasing degree of overheating of the surface by the time the center is processed adequately to avoid "green" or "painty" flavours. Thus, use of temperatures for processing in excess of about 120° C. results in products which tend to be less bland, even though the duration of the heat treatment is reduced, because the surface of the beans has been processed to the "beany" or "bitter" stage.

The PSM produced according to the invention generally has a protein content of about 40-42% and a fat content of about 20-21% when prepared from dehulled beans depending on the composition of the original soybeans. The PSM thus produced represents an important source of high quality fat, as well as protein. The low cost of processing soybeans into PSM coupled with its extreme blandness of flavour, makes it a very suitable ingredient for use in many fat-containing foods in which other commercially available full fat soy flour or other types of soy flours are unsuitable because of the residual beany flavour of the latter.

The following examples illustrate the invention.

EXAMPLE 1

Soybeans used were of sound quality, well cleaned and free from extraneous weed seeds and other materials. In carrying out the dehulling operation the following steps were followed:

(A) the beans were first heated in a stream of hot dry air at a temperature 90° C. for 5-8 minutes, or until the hulls become a little loosened from the cotyledons. It is only necessary that the hulls have become loosened to the extent that the entire hull can be easily removed by rubbing in the palm of the hand.

(B) the warm surface-dried beans are passed through a hulling machine in which the beans are abraded against themselves and also against an abrasive element which is included in such machines. It has been found that an abrasive rice whitener is very suitable for this purpose. Machines manufactured by Satake Engineering Co. Ltd. of Tokyo, Japan, in particular model HS-2B have been found suitable for the dehulling step. It is important that the hulls are separated with a minimum of mechanical damage being done to the cotyledons, such as scratching, cracking or breaking. Avoidance of mechanical damage is especially important if the hulled soybeans are to be stored from some period of time prior to further processing. The reason for this is that when the cells of the soybean cotyledons are physically damaged at this stage, the enzymes present begin to react with the contained soybean oil, resulting in development of off flavours, especially "painty" or "green" flavours or aromas.

(C) the dehulled soybeans are then separated from the hulls as completely as possible, using aspiration equipment. At the same time the dehulled soybeans may be cooled down, which is especially important if the dehulled material is to be stored for some period of time before further processing.

(D) the dehulled soybeans were then subjected to a controlled heat treatment. The degree of heating of the beans is determined to some extent by the use to which the ultimate PSM will be put. In the example being described the dehulled soybeans are placed in a well insulated batch-type steamer so arranged that the steamer is filled from the top, and emptied from the bottom at the end of the steaming period. Live steam is fed into the soybeans through a vertical perforated tube running almost the full vertical length of the steamer. A supply of dry potable steam at atmospheric pressure is passed through the soybeans until the beans reach a temperature of 100° C., as indicated by a thermometer as well as by the observation that live steam is escaping from the top of the mass of beans. The steam flow is maintained so that the beans are held at 100° C. for ten minutes. Then the steam is turned off and the hot steaming beans are dropped from the steamer into an insulated container.

While still very hot the soybeans were passed between smooth rollers in a roller mill with the gap between rolls set at 0.4 mm. The soybeans are flattened and exit from the mill in a flaked condition, the flakes having a plurality of cracks and fissures throughout. The soybeans cool down to some degree during rolling due to loss of steam from the beans, especially as they are flattened by the rolls.

The soybean flakes were further dried in a forced draft dehydrator using hot air at an inlet temperature of 90° C. The temperature of the flakes is kept below 80° C. Because the flakes are very thin, and have a fractured structure they dry very rapidly in the dehydrator. The soybeans are dehydrated to about 3-4% moisture content and cooled to 30° C. or less: they may then be pulverised in a grinder to a degree of fineness suitable for further use applications.

In an alternate method the dehulled and split soy beans are fed at a uniform rate through a trap into a continuous steamer. This consists of a well insulated horizontal trough in which is turning a helix and paddles, the speed of which can be varied by an appropriate speed controller. Potable steam is injected into the base of the trough through a plurality of orifices. Thus as the split soybeans enter the trough through the trap they are subjected to rapid heating by live steam and are simultaneously mixed by the paddles to ensure uniform heating and are transported through the steam zone. The speed of rotation of the helix is adjusted so that the residence time of the dehulled and split soybeans at 100° C. is 10 minutes. The treated beans exit from this continuous steamer directly into the nip of the smooth rolls of a roller mill described above, then are further processed by drying and pulverising as described.

The pulverised PSM produced from the flaked dried soybeans had almost no flavour, being quite bland. The minimal flavour which could be detected is a pleasant slightly sweet, buttery, egg-like flavour. The PSM was completely lacking in any beany or bitter flavour, and was also lacking in painty or green flavour.

EXAMPLE II

Dehulled soybeans were treated as in example 1 except that the final dehydration step was omitted. The cooled flaked soybeans were frozen and packaged for further use then used as required in the preparation of various food products, for example for inclusions in high protein bread doughs. Alternately, the cooled flaked soybeans were used directly as an ingredient in high protein biscuits (cookies) without having to be held frozen. In this case the flakes were used in the manufacture of biscuits on the day of their manufacture, or held overnight in a cool-room.

EXAMPLE III

Dehulled soybeans were processed as in example I except that the time of steaming at 100° C. was varied to cover a range of periods of time, as shown. In each case the dried soya flakes were reduced to a fine meal using a laboratory grinder. The resultant soy flours were compared for flavour and appearance.

| Time of steaming at 100° C. | Colour of soy flour | Flavour/aroma of soy flour |
|---|---|---|
| 2½ minutes | light straw colour | bland |
| 5 minutes | light straw colour | bland |
| 7 minutes | light straw colour | bland |
| 10 minutes | light straw colour | bland |
| 15 minutes | light straw colour | bland |
| 20 minutes | straw colour | almost bland |
| 30 minutes | darker straw colour | slightly beany |
| 40 minutes | dark straw colour | beany |

It is apparent from the above results that with increasing time of steaming at 100° C. for longer than about 20 minutes there is deterioration in flavour of and appearance of the soy flour when tasted in the powdered form.

EXAMPLE IV

Dehulled and split soy beans were prepared as in example I (A, B, C) and were then subjected to a controlled heat treatment in heated water instead of in live steam.

The dehulled soybeans were added to an excess of water held at the temperatures and for the times shown in the results hereunder. The times of exposure were measured from the time at which the temperature of the water returned to the stated temperature after addition of the dry dehulled beans.

After completion of each nominated heat treatment, the beans were removed from the water, quickly drained and weighed, then, while still hot, rolled into flakes, dried and pulverised as described in example I. The following observations were made to compare the various treatments:

| Temp. of treatment in water | Duration of treatment | Colour of soy flour | Flavour/aroma of soy flour |
|---|---|---|---|
| 95° C. | 20 mins | Light straw | Bland |
| 95° C. | 15 mins | Light straw | Bland |
| 95° C. | 10 mins | Light straw | Very slightly raw flavour |
| 90° C. | 20 mins | Light straw | Bland |
| 90° C. | 15 mins | Light straw | Very slightly raw flavour |
| 85° C. | 20 mins | Light straw | Almost bland |
| 80° C. | 20 mins | Light straw | Raw, green and painty |

It is apparent from the above results that whereas it is possible to produce a bland tasting soy flour or meal by subjecting the soybeans to heating for up to 20 minutes in water at 85° C., the flavour quality of the resultant product is unacceptable if the temperature in water is at 80° C. for 20 minutes.

In an alternate method, the dehulled and split soybeans were fed continuously and at a controlled rate, into a continuous rotary water blancher in which the water was maintained at 95° C. The speed of rotation of the screw section of the water blancher was controlled so that the beans were at 95° C. for a total of 15 minutes before being lifted from the hot water by the emptying device on the blancher. The beans so treated passed across a dewatering screen, then fed while still very hot to a roller mill and were further processed as in example I to produce a dried and pulverised meal. The resultant product had a light straw colour and a completely bland flavour and aroma.

EXAMPLE V

Dehulled soybeans were processed as in example 1 except that instead of being steamed at atmospheric pressure at 100° C., the beans were steamed under pressure at 120° C. for periods of 2½, 5, 10 and 20 minutes. The following observations were made:

| Time of Pressure Steaming at 120° C. | Colour of Soy Flour | Flavour/aroma of soy flour |
|---|---|---|
| 2½ minutes | straw colour | slightly beany |
| 5 minutes | dark straw colour | beany |
| 10 minutes | light brown | more beany |
| 20 minutes | medium brown | very beany |

It is apparent when soybeans are treated at a temperature of 120° C., as compared to example 3 (100° C.) 2½ minutes exposure at 120° C. is approximately equivalent to 20–30 minutes at 100° C. as far as development of the beany flavour is concerned. Along with increase in beany flavour, there is also a pronounced darkening of the soy flour.

EXAMPLE VI

Dehulled split soybeans were steamed in batches as described in Example I, except that the beans were held at 100° C. for quite short periods, ranging from 30 seconds to 2½ minutes, with an unheated control treatment. The heat-treated beans were flaked, dried and further pulverised as described. The unheated control was simply pulverised in the raw state. There was a marked range of flavour characters in the treatments as follows:

| Heat treatment - number of minutes at 100° C. (steam heated) | Flavour of soy flour (tasted 30 days after processing) |
|---|---|
| .0 mins | Very raw, green, painty flavour |
| 0.5 mins | Raw, green, painty flavour |
| 1.0 mins | Raw, green, painty flavour |
| 1.5 mins | Less raw, green, painty flavour |
| 2.0 mins | Slight "raw" flavour |
| 2.5 mins | Bland flavour |

It is apparent from this test that, under the above conditions of steaming of dehulled split soybeans, 2–2½ minutes at 100° C. is the threshold minimum range for preventing the development of green, painty or raw flavours in soy flour.

EXAMPLE VII

Dehulled soybeans were processed as in example VI except that instead of being processed in steam under pressure in excess of atmospheric pressure at a temperature of 120° C., the beans were processed at higher temperatures. To achieve this on a batch basis, it was necessary to use a small pressure vessel with a quick release lid.

| Temp. in steam under pressure | Duration of treatment | Colour of soy flour | Flavour/aroma of soy flour |
|---|---|---|---|
| 130° C. | 0.5 min. | straw | slightly raw flavour |
|  | 1.0 min. | straw | bland |

-continued

| Temp. in steam under pressure | Duration of treatment | Colour of soy flour | Flavour/aroma of soy flour |
|---|---|---|---|
| | 1.5 min. | dark straw | reasonably bland |
| | 2.0 min. | dark straw | slightly beany |
| | 2.5 min. | fawn | beany |
| 135° C. | 0.5 min. | straw | bland |
| | 1.0 min. | straw | bland |
| | 1.5 min. | dark straw | slightly beany |
| | 2.0 min. | fawn | beany |
| | 2.5 min. | light brown | beany |

It is apparent from these results that with treatment in steam at increasing temperatures, time required to eliminate the green, raw or painty flavour is reduced. Likewise the time required to induce a beany flavour is reduced.

It will be realised that a degree of delay is involved in reducing the pressure after each steam treatment so the beans can be removed from the vessel, and a similar delay is involved in each treatment.

It was observed that the flavour quality of a soy flour produced in steam at 100° C. and described as bland is of superior flavour as compared to the bland treatments produced at higher temperatures. It is believed that this may be because the surface of an individual soybean reaches a higher temperature when treated at, say 130° C. before the centre of the bean reaches a temperature adequate to prevent development of a raw flavour in the centre tissue.

At that stage, the surface tissue may have then already developed a degree of beany flavour. The final flour may thus be a mixture of different flavour qualities to a greater extent than for treatments carried out at a lower temperature.

The foregoing examples are illustrative of the invention only and it will be appreciated that various times, temperatures and pressures may be selected within the ranges disclosed which will result in the production of a satisfactory product.

In order to evaluate the importance of the invention, the various samples of processed beans prepared as referred to herein were incorporated into a liquid formulation, in which form any flavour changes became very perceptible to the palate. The liquid formulation used was in the nature of a milk-like beverage. The hulled soybeans variously treated and at 4% moisture content (103. g) were added to 1 liter of water to which had been added 0.9 g sodium bicarbonate. This was brought to the boil, then simmered 10 minutes. The weight of this was restored to the initial weight, then the mixture was blended in a liquidizer at full speed for 1 minute. To this was added 9 g of bland vegetable oil, 1 g salt (NaCl) and 12.5 g of sugar, and the mixture was blended for a further 1 minute at full speed. The mixture was then homogenised in a laboratory homogeniser. The "milks" were chilled overnight, then tasted.

| Steaming treatment to which hulled soybeans had been exposed | Flavour of "milk" prepared from product | Colour of "milk" | Comments |
|---|---|---|---|
| 2½ mins 100° C. | Bland flavour | Milky white | Very acceptable |
| 5 mins 100° C. | Bland flavour | Milky white | Very acceptable |
| 10 mins 100° C. | Bland flavour | Milky white | Very acceptable |
| 20 mins 100° C. | Very slightly beany note | Slightly darker | Reasonably acceptable |
| 40 mins 100° C. | Slight beany note | Light brown colour | Unacceptable |
| 2.5 mins 120° C. | Very slight beany note | Light brown colour | Reasonably acceptable |
| 5 mins 120° C. | Slight beany note | Light brown colour | Reasonably acceptable |
| 10 mins 120° C. | Obvious beany flavour | Browner | Objectionable |
| 20 mins 120° C. | Strong beany flavour | Quite browned | Objectionable |

These results show that the flavour and colour differences between the various heat treatments follow through into a food product in which they are used.

Quite clearly, by use of other flavourants or seasonings it is possible to disguise a mild degree of beany flavour in a prepared food. However, the need to do this represents a serious limitation to the general utilisation of normal full fat soy flours.

We claim:

1. The method of processing soybeans which comprises the steps of
   (a) treating dehulled soybeans (1) with live steam or water under atmospheric pressure, the soybeans being held at temperatures from 80° to 100° C. for 2½ to 20 minutes; or (2) with live steam under pressure in excess of atmospheric pressure or hot water under steam pressure in excess of atmospheric pressure, the treatment time in each case being sufficient to avoid green, painty or raw flavors developing in the soybean product on storage but short enough such that beany or bitter flavors do not develop in said product;
   (b) compressing the beans as they exit from step (a) to flatten them and form a plurality of cracks or fissures throughout the beans, the beans cooling during the compression step; and
   (c) dehydrating the flattened beans while keeping their temperature below 80° C. for a period of time to reduce the moisture content to the desired level.

2. The method as claimed in claim 1 wherein the dehydrated flattened beans produced in step (c) are reduced to a flour, meal or grits.

3. The method of processing soybeans as claimed in claim 1, wherein the treatment of step (a) comprises treating the dehulled soybeans with live steam or water under atmospheric pressure, the soybeans being held at temperatures from 85° to 100° C. for 2½ to 20 minutes.

4. The method of processing soybeans as claimed in claim 1, wherein the treatment of step (a) comprises treating the dehulled soybeans in live steam under pressure in excess of atmospheric pressure or in hot water under steam pressure in excess of atmospheric pressure.

5. The method as claimed in claim 4 wherein said soybeans are treated with live steam or hot water under steam pressure of 15 psi gauge for 2½ minutes.

6. The method as claimed in claim 2 wherein said beans are treated at temperatures ranging from 85° to 100° C. for 2½ and 15 minutes.

7. The method as claimed in claim 3 wherein said soybeans are held at temperatures ranging from 85° to 100° C. for 2½ to 15 minutes.

* * * * *